(12) United States Patent
Huang et al.

(10) Patent No.: US 8,277,164 B2
(45) Date of Patent: Oct. 2, 2012

(54) HOIST SUSPENSION FRAME FOR FLATBED TRAILERS

(75) Inventors: Sun Huang, Fremont, CA (US); Philip Tam, Union City, CA (US); Hans Vosskamp, Hayward, CA (US)

(73) Assignee: Paceco Corp., Hayward, CA (US)

( * ) Notice: Subject to any disclaimer, the term of this patent is extended or adjusted under 35 U.S.C. 154(b) by 193 days.

(21) Appl. No.: 12/471,322

(22) Filed: May 22, 2009

(65) Prior Publication Data

US 2009/0290965 A1 Nov. 26, 2009

Related U.S. Application Data

(60) Provisional application No. 61/055,923, filed on May 23, 2008.

(51) Int. Cl.
*B60P 1/54* (2006.01)

(52) U.S. Cl. ............ 414/542; 212/180; 14/73.5

(58) Field of Classification Search .......... 296/43; 212/180; 414/542; 52/64, 653.1; 14/73.5
See application file for complete search history.

(56) References Cited

U.S. PATENT DOCUMENTS

| | | | | |
|---|---|---|---|---|
| 90,263 A | * | 5/1869 | Herthel | 14/4 |
| 132,398 A | * | 10/1872 | Harding | 14/12 |
| 336,104 A | * | 2/1886 | Godman | 14/4 |
| 1,781,517 A | * | 11/1930 | Mckeown | 52/573.1 |
| 2,730,249 A | * | 1/1956 | Edwards | 414/542 |
| 2,751,095 A | * | 6/1956 | Haverstick et al. | 414/542 |
| 2,773,606 A | * | 12/1956 | Shepherd | 414/23 |
| 2,778,512 A | * | 1/1957 | Strona | 414/542 |
| 2,996,201 A | * | 8/1961 | Neher | 414/542 |
| 3,006,485 A | * | 10/1961 | Crawford | 414/542 |
| 3,211,306 A | * | 10/1965 | Kersgard et al. | 414/542 |
| 3,572,513 A | * | 3/1971 | Tantlinger et al. | 212/180 |
| 3,797,672 A | * | 3/1974 | Vermette | 52/116 |
| 3,841,695 A | * | 10/1974 | Woodward | 296/43 |
| 4,187,048 A | * | 2/1980 | Bohlmann | 414/542 |
| 5,743,702 A | * | 4/1998 | Gunderson | 414/542 |
| 6,152,510 A | * | 11/2000 | Newsome | 296/10 |
| 6,722,828 B2 | * | 4/2004 | French | 410/37 |
| 6,857,677 B1 | * | 2/2005 | Giles et al. | 296/43 |
| 2005/0105996 A1 | * | 5/2005 | Risser | 414/542 |

FOREIGN PATENT DOCUMENTS

GB 2105294 A * 3/1983

* cited by examiner

*Primary Examiner* — Saul Rodriguez
*Assistant Examiner* — Jonathan Snelting
(74) *Attorney, Agent, or Firm* — Brian Beverly; Beeson Skinner Beverly, LLP

(57) ABSTRACT

A removable frame for detachable mounting onto a trailer flatbed chassis for suspending a carrier beam extending transversely to and beyond the lateral edges of the chassis, the carrier beam having a pair of movable trolley hoists suspended therefrom whereby cargo can be loaded onto and off from both sides of the bed of the trailer chassis.

7 Claims, 6 Drawing Sheets

US 8,277,164 B2

HOIST SUSPENSION FRAME FOR FLATBED TRAILERS

CROSS-REFERENCE TO RELATED APPLICATIONS

This application claims the benefit of U.S. Provisional Application No. 61/055,923 filed May 23, 2008.

BACKGROUND OF THE INVENTION

1. Field of the Invention

The present invention relates to a hoist suspension frame for moving cargo onto and off of a flatbed trailer chassis. More particularly the present invention comprises a temporary steel frame which can be removably mounted on a flatbed trailer chassis. The frame extends laterally from the trailer chassis to permit a hoist mechanism to move cargo between the trailer bed and points adjacent the trailer.

2. Description of the Prior Art

The use of various types of machinery in one form or another for the purpose of moving cargo onto and off of a flatbed trailer chassis is known in the prior art. Numerous designs, structures, and forms of apparatuses, and a variety of methods, are disclosed by and utilized in the prior art. These have been developed for the accomplishment of both the general and specific objectives, purposes, and requirements of cargo handling, and specifically for loading and unloading trailer chassis.

Almost all cargo, apart from cargo containers which must be handled by specialized cranes due to size or weight, is now loaded onto and off of flatbed trailers by motor-powered forklift trucks. Cargo packages are no longer lifted directly by dock workers due to considerations of size and weight, and because safety rules prevent or at least inhibit direct handling.

Forklift trucks usually lift a single item, or multiple identical items if they are stacked. A lift truck must make multiple trips to unload a trailer flatbed chassis because of its limited load carrying capacity in comparison with the load carrying capacity of a flatbed chassis. Forklift trucks also must offload a trailer from both sides of the chassis because of the limited forward reach of their forks.

The trolley frame contemplated according to the present invention departs substantially from the conventional concepts and designs taught and used by the prior art, and in doing so, provides an apparatus primarily developed for the purpose of overcoming the problems as described above, but it accomplishes the result in a different and improved manner for handling cargo loads more easily, quickly, conveniently, accurately, and economically. The present invention effectively provides removable machinery which can be temporarily mounted to a flatbed trailer chassis to unload and offload cargo to and from any area on the chassis bed to or from locations to either side of the chassis.

SUMMARY OF THE INVENTION

In view of the disadvantages inherent in the known types of apparatuses for short lift cargo transfer to and from flatbed trailer chassis presently existing in the prior art, the present invention provides a new removable and collapsible apparatus and construction for cargo handling for flatbed trailer chassis. The invention can be utilized to load and unload flatbed trailers faster, more conveniently, and with more versatility than forklift trucks.

The present invention is a removable and collapsible trolley frame for flatbed trailers. It is comprised of four vertically oriented corner posts for securement to the stake pockets located on the corners of a flatbed trailer chassis. A pair of tie beams each interconnects two of the four corner posts disposed at the front and rear ends of the chassis. A pair of hoist rails is supported by the tie beams. One end of each of the hoist rails is fixedly secured to one of the tie beams. The opposite end of each of the hoist rails is engaged to the other one of the tie beams with a floating connection. The floating connection allows the hoist rails to reciprocate slightly lengthwise at the point of interconnection with the tie beam in response to flexing of the flatbed as it is loaded and unloaded. A carrier beam is suspended perpendicularly from the hoist rails with floating connections allowing the carrier beam to traverse the length of the hoist rails, and thus virtually the length of the trailer bed. The carrier beam extends beyond each of the hoist rails and past the lateral edges of the chassis to permit the pickup and deposit of cargo adjacent the flatbed trailer. A least one hoist is suspended from the carrier beam by a trolley for reciprocal movement along the carrier beam. The configuration of the trolley frame thus permits access to cargo anywhere on or alongside the bed of the trailer chassis.

BRIEF DESCRIPTION OF THE ILLUSTRATIONS

The invention is illustrated in the accompanying drawings, but not limited by reference to the particular embodiments shown therein, of which:

DESCRIPTION OF THE ILLUSTRATED EMBODIMENT

Reference is made to the drawings for a description of the preferred embodiment of the present invention wherein like reference numbers represent like elements on corresponding views.

Figure 1:
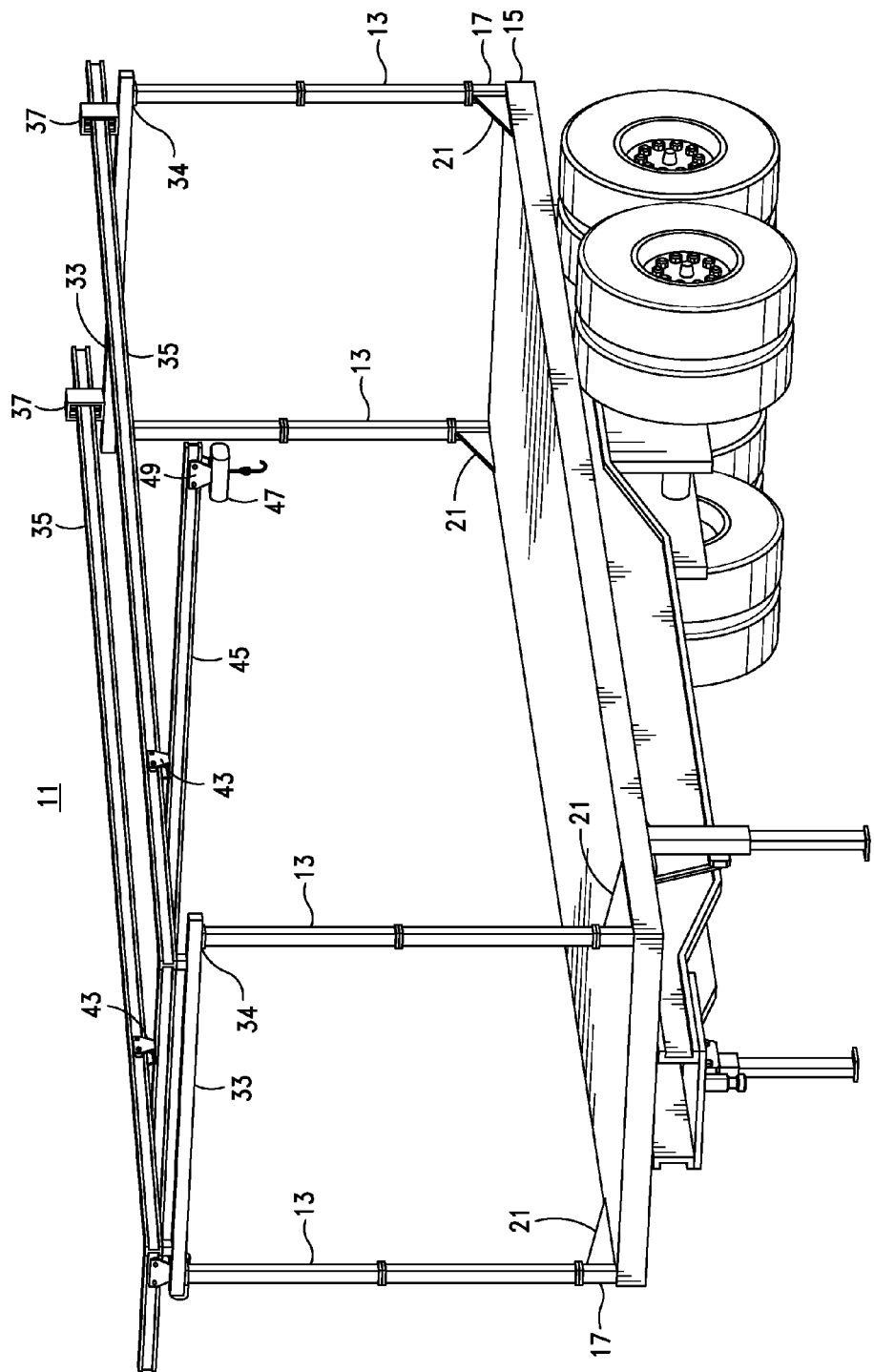
FIG. 1 is a perspective view of a trolley frame for flatbed trailers according to the present invention shown mounted on a flatbed trailer chassis.
Figure 2:
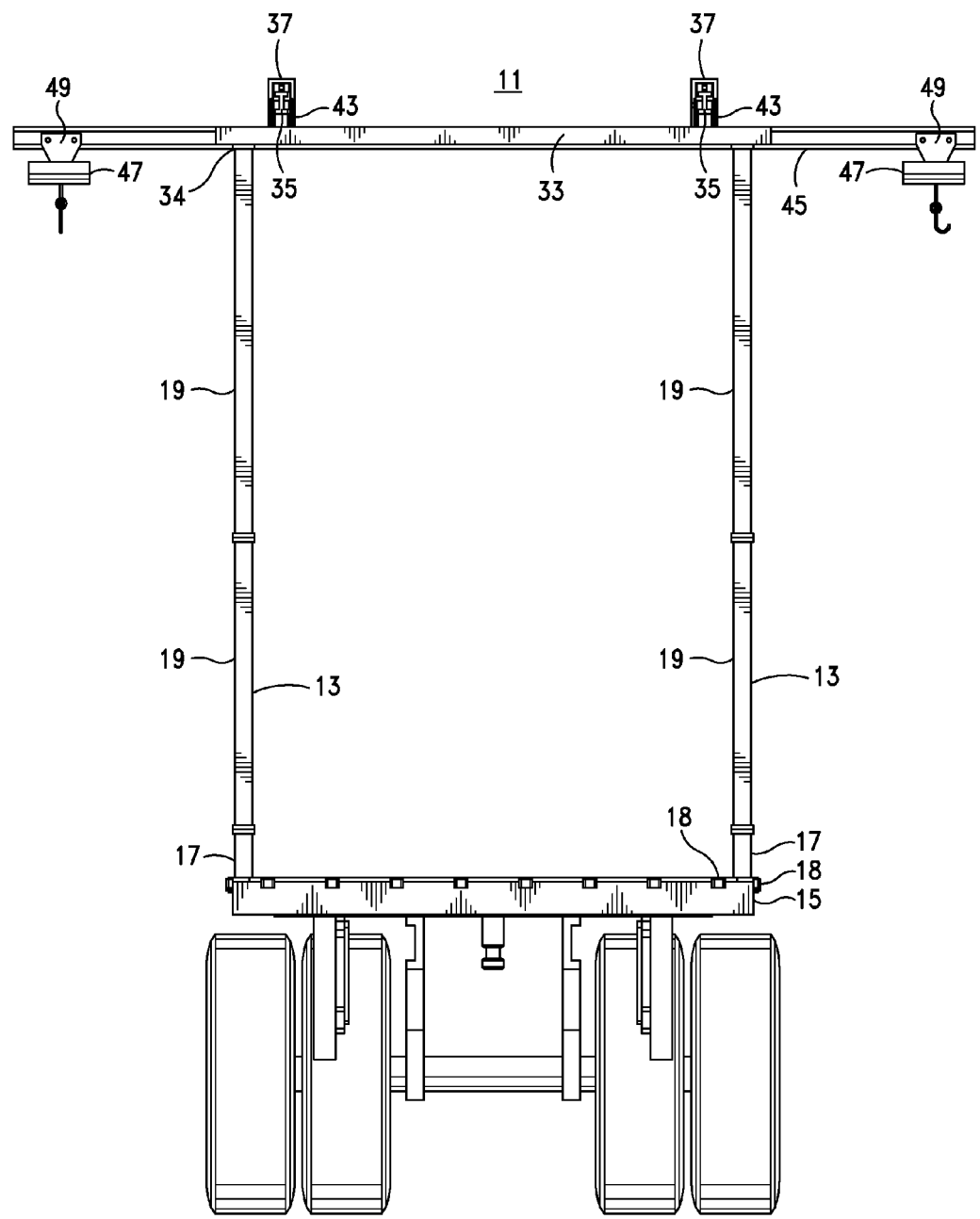
FIG. 2 is a front elevation of the trolley frame shown in FIG. 1.
Figure 3:
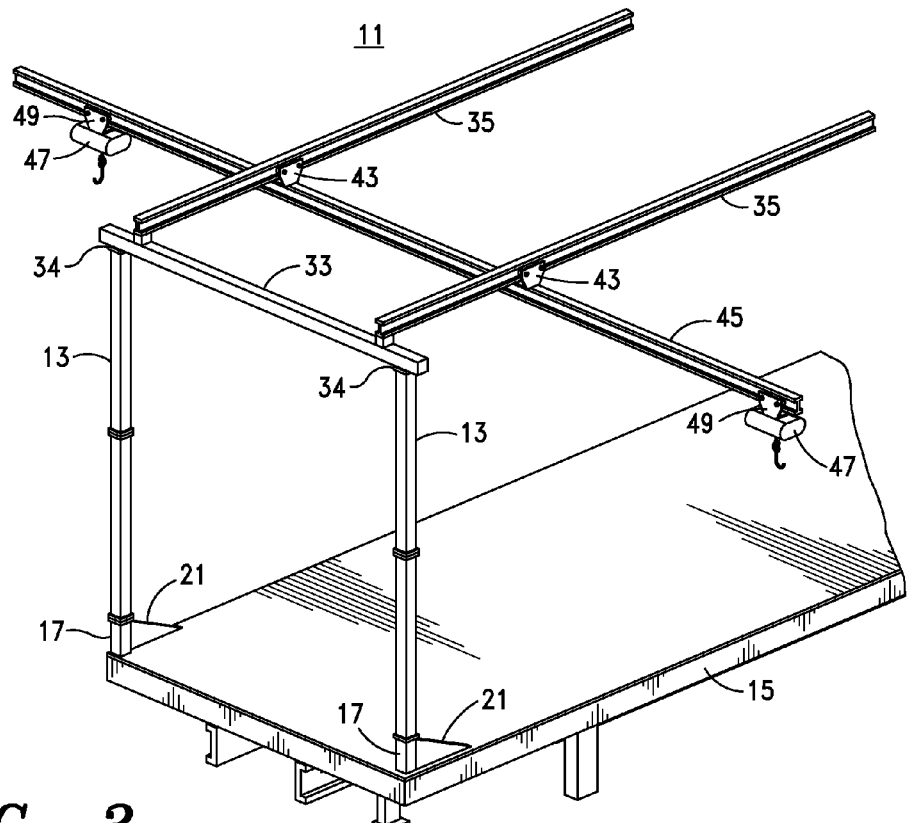
FIG. 3 is a top partial perspective view of the trolley frame shown in FIG. 1.

FIGS. 1-3 show a removable and collapsible trolley frame 11 for flatbed trailers. The frame 11 is supported by four vertically oriented corner posts 13 secured to the corners of a flatbed trailer chassis 15. The posts are preferably made in at least two detachably interconnected pieces for ease of assembly, disassembly, storage, handling, and to accommodate different heights of the frame. The figures show the posts comprised of three sections, but it should be understood that the posts could comprise any number of sections.

Figure 5:
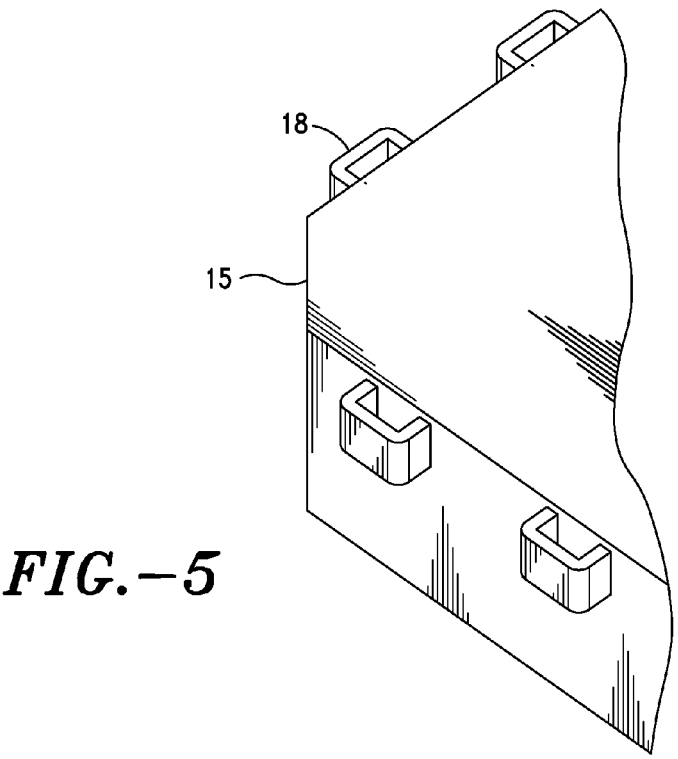
FIG. 5 is a broken out partial perspective view of the corner pockets of a trailer chassis.
Figure 6:
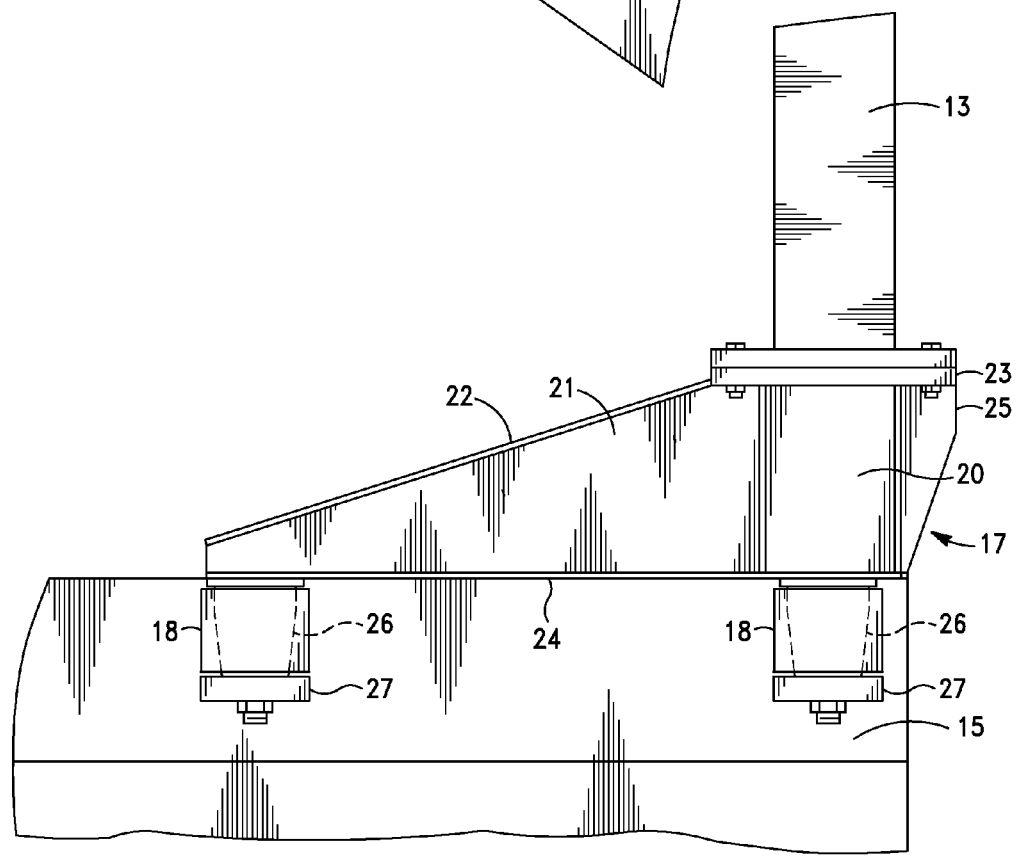
FIG. 6 is a broken out side elevational view of the base of a corner post of the trolley frame secured to the corner pockets of a trailer chassis.

The sides of a flatbed trailer generally have stake pockets regularly spaced a standard distance for receiving panel stakes or tie down points. The stake pockets 18 that are located at the corners of the chassis 15, as shown in FIG. 5, will hereafter be referred to as "corner stake pockets" for purposes of clarity. As shown in FIGS. 2, 3 and 6, a corner post base 17 is formed for engagement or securement to the corner stake pockets 18 of a flatbed trailer chassis 15. The individual sections 19 of each corner post 13 (see FIG. 2) can be made in various lengths to alter the height of the frame to accommodate stacked freight loads of different heights. The abutting ends of the corner post sections 19 can be bolted together, such as shown in FIG. 6, or provided with an interlock mechanism, or a suitable combination thereof.

Figure 7:
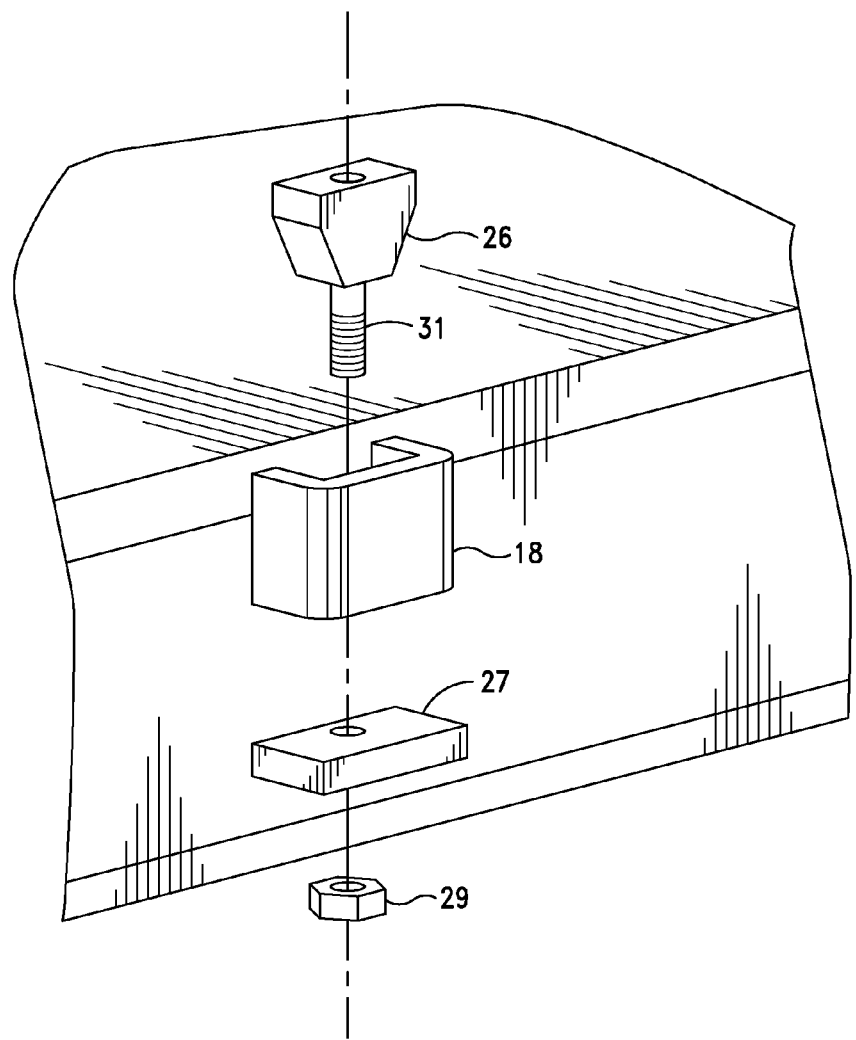
FIG. 7 is an exploded perspective view of a corner stud connector for securing the trolley frame to a trailer chassis corner pocket.
Figure 8:
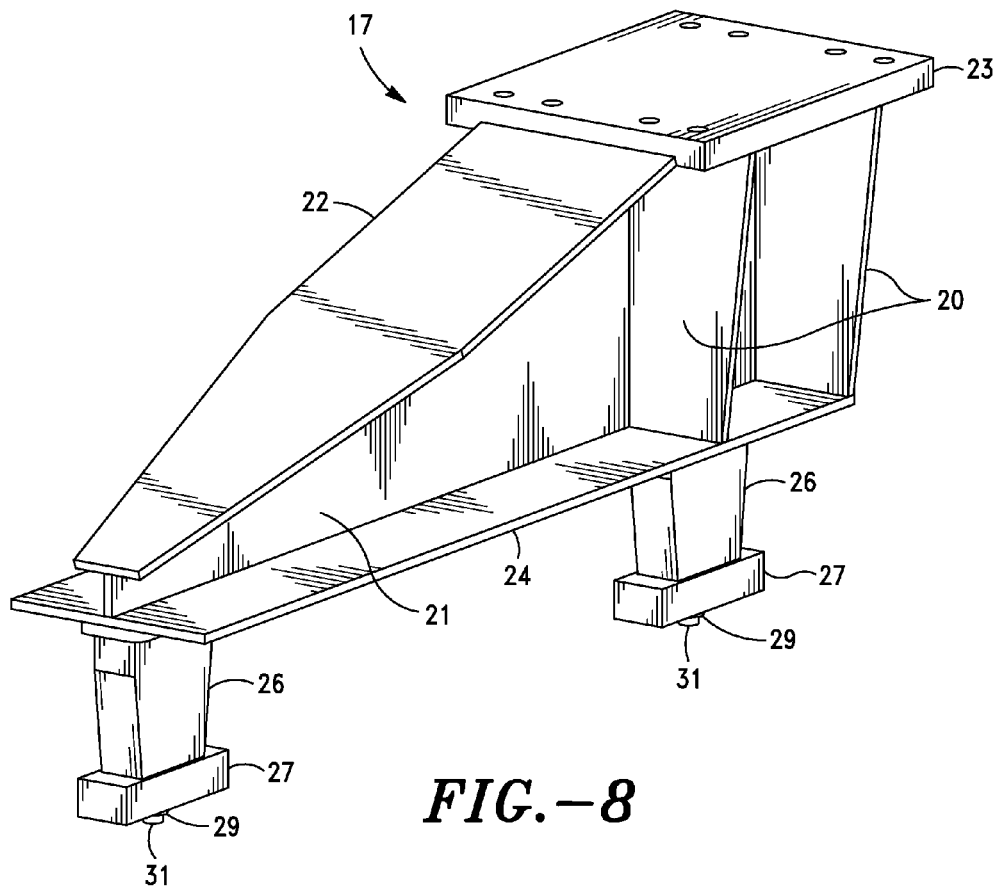
FIG. 8 is a perspective view of a corner post base according to the invention.

As shown in FIG. 6, the base 17 of each corner post 13 engages at least two of the chassis corner pockets 18 for stability. The base 17 comprises a footing 20 and a vertically disposed primary gusset 21 projecting inwardly from the footing 20 to provide posts 13 with strength and rigidity along the longitudinal dimension of the chassis 15. See also FIGS. 1 and 8. In the illustrated embodiment footing 20 has an H-shaped horizontal profile having forward, rear and center walls. However, it will be readily understood that the footing could be constructed with four walls, or as a cylinder, or in other configurations suitable for providing direct support for the weight of post 13. An inclined gusset top plate 22 extending from post cap 23 is secured to the top of gusset 21 to strengthen and stabilize the top of the gusset 21. A bottom plate 24 extends underneath footing 20 and primary gusset 21. Secondary gusset 25 (see FIG. 6) extends outwardly from footing 20 and depends from cap 23 to provide additional stability to footing 20 and cap 23. Studs 26 extend downwardly from bottom plate 24 at a spacing coincident with the location of the corner stake pockets 18 on chassis 15. The lower part of each stud 23 is beveled to facilitate centering of the studs 26 in the chassis pockets 18 as shown in FIGS. 6-7. A retaining plate 27 and nut 29 engage threaded shaft 31 to secure studs 26 in pockets 18. Once fastened to the chassis pockets 18, the base 17 provides rigid and stable support for corner post 13.

With reference again to FIGS. 1-3, a pair of tie beams 33 is provided, each of which interconnects a pair of corner posts 13 disposed on each end of the chassis 15. The tie beams 33 are secured to the tops of the corner posts 13 with detachable connections 34 to permit the end frames, each consisting of two corner posts 13 and a tie beam 33, to be disassembled. It will be understood that the corner posts 13 can be comprised of shorter sections as and where required.

A pair of hoist rails 35 is supported by the tie beams 33. One end of each of the hoist rails 35 is detachably secured to one of the tie beams 33. Usually it is the forward end of the hoist rail 35, but alternatively the rearward end could be secured as may be appropriate to the circumstances. The opposite end of each of the hoist rails is engaged to the other one of the tie beams with floating connections 37 that allow the hoist rails 35 to reciprocate slightly lengthwise at the point of interconnection.

Figure 4:
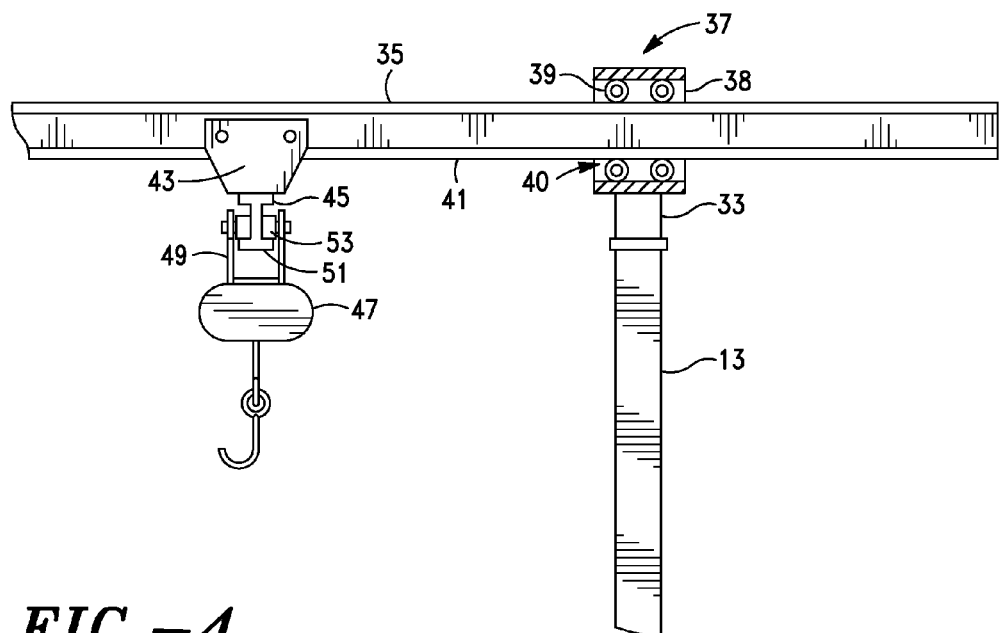
FIG. 4 is a broken out partial side elevational view of the rear end of the trolley frame showing a sectional view of the floating connection between one of the posts and one of the hoist rails of the trolley frame.
Figure 9:
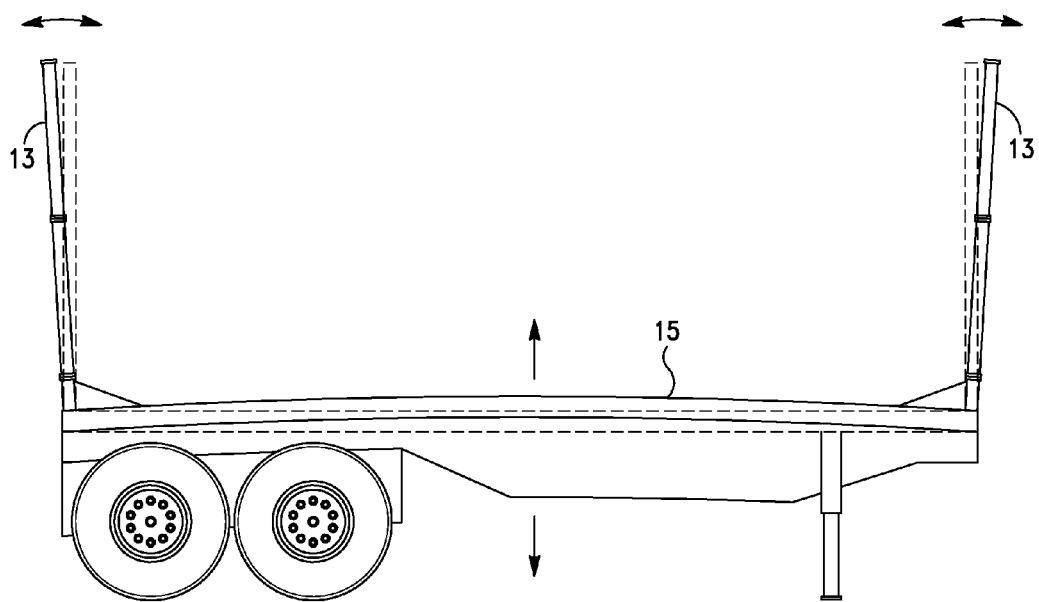
FIG. 9 is a side elevational representation of a trailer chassis having corner posts mounted on the corners of the chassis according to the invention showing movement of the posts responsive to flexing of the chassis.

Referring now to FIGS. 1, 2 and 4, each hoist rail floating connection 37 is effected by a casing 38 which is secured to tie beam 33 and which surrounds and captures one of the hoist rails 35 in rail opening 40. The casings 38 house rollers 39 in the rail openings 40 for providing sliding support for the hoist rails 35. While the illustrated embodiment shows bottom rollers disposed below and top rollers disposed above the hoist rails 35 (see FIG. 4), it is contemplated that the top rollers may be dispensed with in other embodiments of the invention. The casings 38 limit lateral and vertical movement of the hoist rails 35, but allow the hoist rails 35 to move longitudinally in the rail openings 40 of the casings 38 to accommodate the change in distance between the tie beams 33 as the tops of the front and rear pairs of corner posts 13 move toward and away from each other when the trailer chassis 15 flexes due to changing loads as indicated by the arrows in FIG. 9. The hoist rails 35 extend beyond the floating connections 37, as seen in FIGS. 1 and 4, so that the hoist rails 35 do not slip out of the floating connections 37 as the trailer chassis 15 flexes. In the illustrated embodiment, casings 38 are mounted on the top of one of the tie beams. Alternatively, the casings 38 may be fastened to the bottom of one of the tie beams 33.

In the illustrated embodiment of the invention, the hoist rails 35 are formed from I-beams, from the lower flanges 41 of which hoist rail trolleys 43 can be suspended, as best seen in FIG. 4. A carrier beam 45 is suspended perpendicularly from the hoist rails 35 with a floating connection in the form of a pair of suspended hoist rail trolleys 43 which allow the carrier beam 45 to transit the hoist rails 35. See also FIG. 3. The carrier beam 45 is secured to the trolleys 43 permitting the carrier beam 45 to reciprocate along the hoist rails 35 between the tie beams 33 for essentially the full length of the chassis 15. The hoist rail trolleys 43 can be adjustably secured to the carrier beam 45 to provide for chassis of different widths, but in most versions the trolleys 43 are fixed to the carrier beam 45 at the standard chassis width. The carrier beam 45 extends farther than the sides of the trailer chassis 15 to allow cargo to be moved between the bed of the trailer and points to each side of the trailer chassis 15.

At least one movable cargo hoist 47 is suspended on a carrier beam trolley 49 from the bottom flanges 51 of the carrier beam for movement along the carrier beam. In the preferred embodiment of the invention, at least a pair of carrier beam hoists 47 is independently suspended from the carrier beam 45 on separate trolleys for independent reciprocal movement along the carrier beam 45. Two hoists can be used cooperatively to counterbalance a load being carried by one of the hoists by providing the other hoist with a suitable counterweight.

FIG. 4 shows hoist rail 35 captured in the floating connection 37 atop tie beam 33. The trolley 43 is engaged with and suspended on rollers (not illustrated) from the lower flanges 41 of the hoist rail 35. Carrier beam 45 is in turn suspended from hoist rail trolleys 43 (see also FIG. 3). Carrier beam trolleys 49 are suspended from carrier beam 45. Finally, carrier beam hoists 47 are suspended from rollers 53 engaged with the lower flanges 51 of carrier beam 45. The hoist rail trolleys 43 and the carrier beam trolleys 49 and the hoists 47 on the carrier beam 45 can be electrically powered for ease of operation.

There have thus been described and illustrated certain preferred embodiments of a trolley frame for flatbed trailers according to the invention. Although the present invention has been described and illustrated in detail, it is clearly understood that the same is by way of illustration and example only and is not to be taken as limiting, the spirit and scope of the present invention being limited only by the terms of the appended claims and their legal equivalents.

We claim:

1. A hoist suspension frame for a flatbed trailer, the flatbed trailer having a flatbed trailer chassis having corners, the hoist suspension frame comprising:

four vertically oriented corner posts for detachable securement to the corners of the flatbed trailer chassis, each said corner post including a corner post base having a footing, a primary gusset projecting from said footing, a horizontal bottom plate fixed to and underlaying said footing and said primary gusset, at least a pair of studs depending from said bottom plate, each stud for insertion into a corner stake pocket located on the flatbed trailer chassis, and means for fastening each of said studs to said corner stake pocket, a pair of tie beams each interconnecting two of said corner posts, a pair of hoist rails, each hoist rail having first and second ends, said first end fixedly secured to a first one of said tie beams, and said second end movably secured to a second one of said tie beams with a floating connection allowing said hoist rail to reciprocate longitudinally at said floating connection, at least one carrier beam disposed transversely to and suspended from said hoist rails with hoist rail trolleys allowing said carrier beam to travel along said hoist rails, and at least one cargo hoist suspended from said carrier beam by a carrier beam trolley allowing said hoist to move along said carrier beam.

2. The hoist suspension frame of claim 1 further comprising:
said corner post base having a gusset top plate secured in perpendicular relation to the top of said primary gusset.

3. The hoist suspension frame of claim 1 further comprising:
a post cap secured to the top of said footing, and
a gusset top plate secured to the top of said primary gusset, said gusset top plate inclined away from said post cap.

4. The hoist suspension frame of claim 3 further comprising:
a secondary gusset projecting from said footing opposite said primary gusset.

5. The hoist suspension frame of claim 1 wherein:
said means for fastening each of said studs to said corner stake pocket includes a threaded shaft depending from said stud, a retaining plate having an aperture for receiving said shaft, and a nut for threadedly engaging said shaft,
wherein, when said stud is received in said corner stake pocket said shaft projects below said corner stake pocket, such that said stud is fastened in said corner stake pocket by fitting said retaining plate on said shaft below said corner stake pocket, and tightened said nut on said shaft.

6. The hoist suspension frame of claim 1 wherein:
said studs have a beveled lower part for facilitating centering of said studs when being received in said corner stake pockets.

7. A hoist suspension frame for flatbed trailers, the flatbed trailers of the type having a trailer chassis having a width and one or more corner stake pockets on each corner, the hoist suspension frame comprising:

four vertically oriented corner posts, each of said corner posts having a corner post base, said corner post base having
a horizontal bottom plate,
a footing supported by said bottom plate,
a primary gusset projecting from said footing and supported by said bottom plate,
at least a pair of studs depending from said bottom plate, said stud studs for insertion into at least two of the trailer chassis pockets, and
means for detachably fastening each of said studs to one of the one or more corner stake pockets, first and second tie beams, each of said tie beams interconnecting two of said corner posts, a pair of hoist rails disposed in generally parallel alignment with said primary gussets of said corner post bases, each of said hoist rails having first and second ends, said first end fixedly secured to said first tie beam, a pair of casings mounted on said second tie beam, each said casing encircling said second end of one of said hoist rails, said casing having at least one roller underlying and providing sliding support for said hoist rail and enabling said second end to reciprocate longitudinally in said casing, a pair of hoist rail trolleys movably engaged with said hoist rails, at least one carrier beam suspended from said pair of hoist rail trolleys transversely to said hoist rails allowing said carrier beam to move along said hoist rails, said carrier beam having a length greater than the width of the trailer chassis, a carrier beam trolley movably engaged with said carrier beam, and at least one cargo hoist suspended from said carrier beam trolley allowing said cargo hoist to move along said carrier beam.

* * * * *

UNITED STATES PATENT AND TRADEMARK OFFICE
CERTIFICATE OF CORRECTION

PATENT NO. : 8,277,164 B2
APPLICATION NO. : 12/471322
DATED : October 2, 2012
INVENTOR(S) : Sun Huang, Philip Tam and Hans Vosskamp Page 1 of 1

It is certified that error appears in the above-identified patent and that said Letters Patent is hereby corrected as shown below:

In column 2, lines 2-3, "A pair of tie beams each interconnects" should read --Each of a pair of tie beams interconnects--.

Signed and Sealed this
Twenty-second Day of January, 2013

David J. Kappos
*Director of the United States Patent and Trademark Office*